US008139280B2

(12) United States Patent
Wu

(10) Patent No.: US 8,139,280 B2
(45) Date of Patent: Mar. 20, 2012

(54) MEMS HIERARCHICALLY-DIMENSIONED DEFORMABLE MIRROR

(76) Inventor: Xingtao Wu, Woburn, MA (US)

( * ) Notice: Subject to any disclaimer, the term of this patent is extended or adjusted under 35 U.S.C. 154(b) by 0 days.

(21) Appl. No.: 12/505,368

(22) Filed: Jul. 17, 2009

(65) Prior Publication Data

US 2011/0013300 A1   Jan. 20, 2011

(51) Int. Cl.
G02B 26/08   (2006.01)
(52) U.S. Cl. .................................................... 359/224.1
(58) Field of Classification Search .... 359/223.1–226.1, 359/290, 291, 871, 872
See application file for complete search history.

(56) References Cited

U.S. PATENT DOCUMENTS 6,504,118 B2 * 1/2003 Hyman et al. ................. 200/181
7,336,412 B2 * 2/2008 Yang ............................. 359/291
* cited by examiner Primary Examiner — Euncha Cherry
(74) Attorney, Agent, or Firm — Xingtao Wu

(57) ABSTRACT

A MEMS hierarchically-dimensioned deformable mirror comprising a substrate, a plurality of spacers disposed on the substrate, a plurality of piezoelectric cantilever microactuators disposed on the plurality of spacers, and a continuous deformable membrane disposed on the plurality of the cantilever assemblies, has significantly improved overall device performances owing to the use of the cantilever microactuators based on relaxor ferroelectric single crystal materials or other piezoelectric materials.

15 Claims, 9 Drawing Sheets

Unimorph Cantilever

Bimorph Cantilever

US 8,139,280 B2

MEMS HIERARCHICALLY-DIMENSIONED DEFORMABLE MIRROR

FIELD OF THE INVENTION

The present invention relates to adaptive optics. More specifically, it relates to an optical Micro-Electro-Mechanical Systems (MEMS) deformable mirror that is actuated by piezoelectric cantilever(s) with improved performances.

BACKGROUND OF THE INVENTION

Optical signals are distorted as they propagate in fluctuating media like atmospheric turbulence. A system to correct the distortion, known as adaptive optics (AO), is employed to optimize system performances in the presence of the random disturbances. Such adaptive wavefront correction is usually achieved by introducing a spatially varying pattern of optical path differences across the aperture of the receiving optical system using Deformable Mirror (DM) technology.

As a critical element to such systems, deformable mirrors offer the greatest promises for high performance wavefront correction. Conventional deformable mirrors use multiple bulk piezoelectric actuators or magnetic actuators to deform large plate mirrors. While these mirrors offer high accuracy and can conform to wavefront distortion associated with broad or narrow band spectrums, they tend to be bulky, heavy, expensive, and typically operate with less than 1000 actuators at relative slow speed.

An emerging generation of deformable mirror (DM) technologies based on Micro-Electro-Mechanical Systems (MEMS) manufacturing is promising to lead to DM components with capabilities exceeding those of conventional DMs while, at the same time, reducing cost, weight, and power electronics requirements. However, MEMS-based deformable mirror technologies have been successful in small stroke applications. Large stroke deformable mirror systems using MEMS actuators have not yet demonstrated sufficient attractive combinations of high stroke, low voltage, and with high system reliability.

U.S. Pat. No. 6,384,952 to Clark et al. (2002), incorporated herein by this reference, discloses a continuous-face-sheet DM that employs a mirrored membrane fabricated, for example, from metal-coated silicon nitride and actuated by an array of vertical comb actuators disposed underneath the membrane. Use of vertical comb actuators can provide higher force and larger stroke for a given applied voltage than the parallel plate electrostatic actuators used in other continuous-face-sheet designs. However, this design requires placing vertical two teeth sets precisely relative to each other, one on the substrate and the other suspended on a membrane member, respectively, thus is unduly complicated in manufacturing the DM structure. Moreover, because of the electrostatic actuation, the device does not offer sufficient actuation force and stroke to meet the stringent requirements of a deformable mirror device for adaptive optics applications.

U.S. Pat. No. 7,336,412 to Yang (2008), also incorporated herein by this reference, describes a microcontrollable, deformable mirror comprising of a mirror membrane under which a plurality of controllable piezoelectric microactuators is coupled to the mirror membrane. Each piezoelectric microactuators comprises a pedestal, a piezoelectric microactuator, and a supporting substrate. The piezoelectric actuator structure is mounted on the supporting substrate and has an unstressed plane and has electrodes defined on opposing surfaces so that in-plane stresses electrically induced in its piezoelectric layer cause the actuator membrane to bend out of the unstressed plane in a selected direction. In the prior invention, the pedestal is connected to the mirror membrane to couple deformation of the piezoelectric actuator into substantially local deformation of the mirror membrane. However, because each of the piezoelectric actuator is mechanically a continuous membrane structure having the pedestal located at or near the membrane center, the bending deformation of the piezoelectric actuator induced by an in-plane stresses is significantly restricted.

SUMMARY OF THE INVENTION

It is therefore an object of this invention to provide a new deformable mirror with high device performances including higher stroke, larger force, higher speed, and with relative low actuation voltage.

This invention results from the realization that a new hierarchically-dimensioned optical MEMS deformable mirror having significantly improved overall system performances can be constructed by using piezoelectric cantilevers that are made of relaxor ferroelectric single crystals.

In one aspect, the invention related to a method of producing a hierarchically-dimensioned MEMS deformable mirror by using bimorph cantilever actuators that are made of relaxor ferroelectric single crystal.

In another aspect, the invention related to a method of producing a hierarchically-dimensioned MEMS deformable mirror by using unimorph cantilever actuators that are made of relaxor ferroelectric single crystal.

In another aspect, the invention related to a method of producing a hierarchically-dimensioned MEMS deformable mirror by using multimorph cantilever actuators that are made of relaxor ferroelectric single crystal.

This invention is also resulted from the realization that a single crystal based deformable mirror system having superior system reliability, stability, durability, and long life time, can be constructed by using relaxor ferroelectric single crystals in combination with other single crystal materials such as single crystal silicon.

Thus, it is a further object of this invention to provide a reliable material system for building the deformable mirror to ensure reliable operation for long time run.

DETAILED DESCRIPTION OF THE INVENTION

To provide an overall understanding of the invention, certain illustrative embodiments will now be described, including actuators and methods for controlling deformable mirrors. However, it will be understood by one of ordinary skill in the art that the systems and methods described herein may be adapted and modified as is appropriate for the application being addressed and that the devices and methods described herein may be employed in other suitable applications, and that such other additions and modifications will not depart from the scope hereof.

Figure 1:
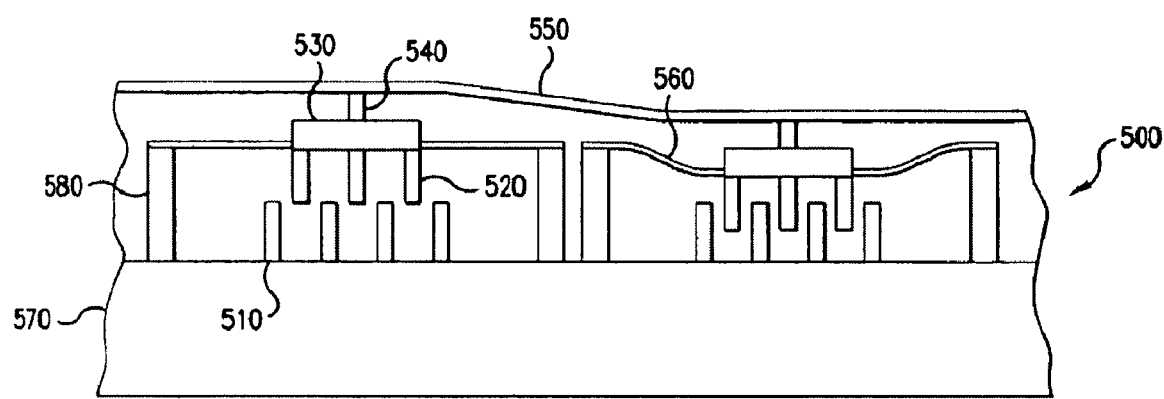
FIG. 1 is a cross-sectional view of a prior art deformable mirror in attachment with comb actuators (Prior Art).

As discussed in the Background section above, prior art MEMS deformable mirror membrane 550, FIG. 1 (see U.S. Pat. No. 6,384,952) is equipped with electrostatic comb actuators 500. The actuators 500 include stator 510 and sliders 520. The sliders 520 are integrated with a slider top 530. Posts 540 attach the slider 520 via the slider top 530 to the deformable mirror membrane 550. Each post 540 will pull on the mirror 550 with the strength of the actuator force that is controlled by the amplitude of the applied voltage. The result is the gradually curved dimple as shown in FIG. 1, allowing the variation in the surface from one actuator to the next to be smooth.

As also delineated in the Background section above, this design has several shortcomings. Because of the requirement of placing teeth set of stators 510 and sliders 520 precisely relative to each other, the manufacturing process for the DM is unduly complicated. Also, due to the electrostatic actuation, the device does not offer high actuation force comparable to that provided by piezoelectric actuators.

Figure 2:
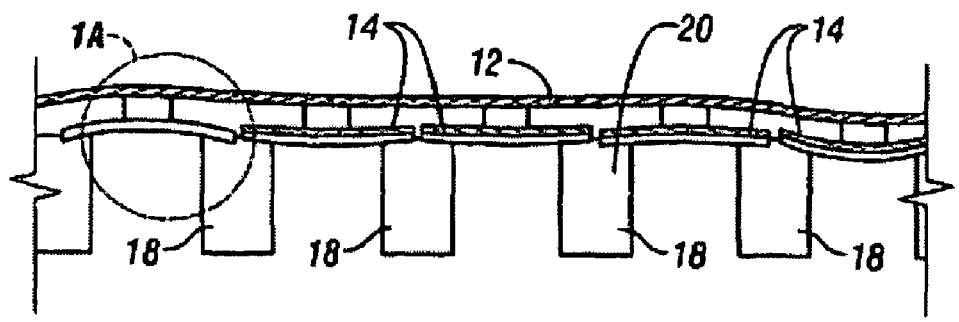
FIG. 2 is a simplified side cross-sectional view of a deformable mirror according to U.S. Pat. No. 7,336,412. (Prior Art)
Figure 2A:
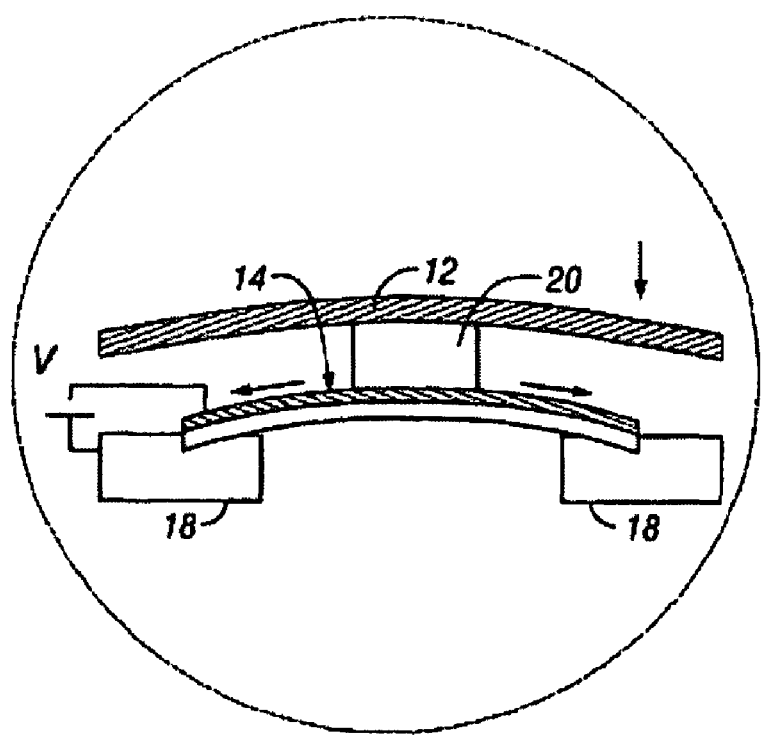
FIG. 2A is the enlargement view of a single actuator 14 coupled to a segment of the mirror membrane 12 according to U.S. Pat. No. 7,336,412. (Prior Art)

As also discussed in the Background section above, the prior art U.S. Pat. No. 7,336,412 is enclosed herein as another reference. The patent discloses a deformable mirror device actuated by an array of piezoelectric actuators, for which FIG. 2 provides a simplified side sectional view for the disclosed deformable mirror. The deformable mirror comprises of a transferred continuous membrane mirror 12 supported by a plurality of individually controllable microactuators 14. Each microactuator 14 is comprised of a thick PZT film disposed on a micromachined support 18. Mirror membrane 12 in turn is connected to layer by a micromachined pedestal 20. A voltage applied to the piezoelectric layer induces stress in a longitudinal direction in the layer causing it to deform and pull on mirror 12 connected to it through indium pedestal 20. Thus, small strains obtainable in a piezoelectric material at modest voltages are translated into large displacements, as shown in FIG. 2A, the enlargement view of a single actuator 14 coupled to a segment of the mirror membrane 12.

This prior art design has a few technical limitations. As shown in FIG. 2 and FIG. 2A, each microactuator 14 is mechanically clamped along its boundary, and enclosed within the boundary is a freestanding continuous PZT membrane with no cut or opening. To transfer the motion of the film to the top mirror membrane 12, a single pedestal member 20 is disposed at or near the center of each of the continuous PZT membranes. Since the suspended PZT membrane is a continuous membrane, being clamped along its boundry, its capability in amplifying displacement is seriously restricted. Furthermore, due to the sol-gel technique used for forming the thick PZT film, the fabrication process of the deformable mirror is complicated in that many spin-on coating steps are required to deposit a thick film. Also, due to the polycrystalline phase of the piezoelectric thin-film, the electro-mechanical performances of the actuator are not satisfactory. Besides, the high post-annealing temperature (>500° C.) of the thin-film process prohibits direct manufacturing of the patterned actuator structures onto a CMOS drive substrate.

Figure 3:
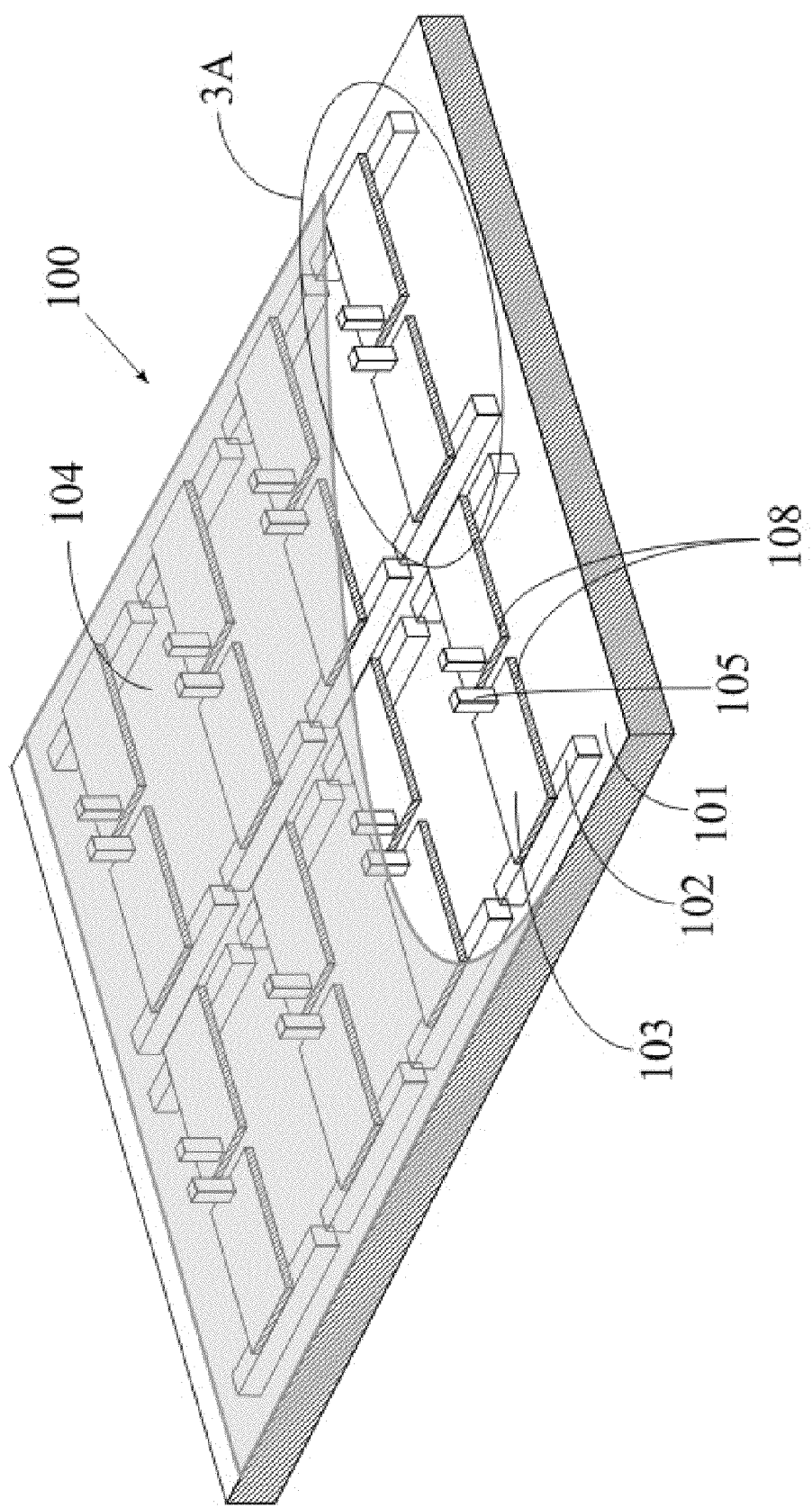
FIG. 3 is a conceptual isometric view of a deformable mirror device having an illustrative 2×4 pixel array according to an illustrative embodiment of the present invention.

Referring now to FIG. 3, a conceptual isometric view of a deformable mirror device 100 according to an illustrative embodiment of the present invention, includes a substrate 101, a plurality of spacers 102 disposed on the substrate, plurality of cantilever microactuators, in particular, a plurality of cantilever assemblies 103 disposed on the plurality of spacers 102, and a continuous deformable membrane 104 disposed on the plurality of the cantilever assemblies 103. Each of the cantilever assemblies comprises a supporting portion 120 in contact with the respective spacer, a beam floating cantilever portion 121 that lies directly vertically over and spaced apart from the substrate, and equipped at the cantilever distal end a post member 105, as shown in FIG. 3C. The floating cantilever portion has a floating outer edge 108 that is not clamped to the spacer structure, but forms a predetermined two-dimensional geometry that defines the material boundary of the floating cantilever portion 121, and as a result, a far end of the floating cantilever portion is able to receive a maximum vertical displacement during actuation. The deformable membrane 104 can be made of any material including silicon, SiC, SiN, metals, and polymers, and optical coating layer(s) can be deposited on the deformable mirror in order to enhance the optical performances of the mirror surface. In controlling the shape of the deformable membrane 104, the plurality of the cantilever microactuator assemblies is formed into a two dimensional pixel map through which each membrane mirror portion (or in other words, pixel) is assigned underneath at least a group of cantilever microactuator(s) as its motion generator. Accordingly, the distribution of the actuator array on the substrate 101 can be assigned as square, rectangular, hexagonal, triangular, and any other geometries depending on the pixel size, array size, the mirror aperture, field of view, and the wavefront aberrations to be corrected by using the deformable mirror device 100.

Figure 3A:
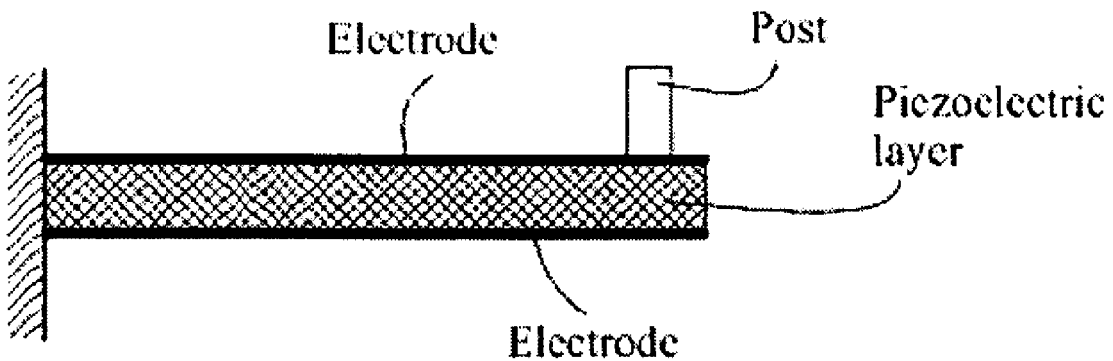
FIG. 3A is a cross sectional views of the layered structure for an electrode-coated cantilever unimorph used as the cantilever assembly in FIG. 3.

According to the present invention, in some preferred embodiments, the cantilever actuator assembly in FIG. 3 is an unimorph cantilever actuator in which only one (1) electrode-coated piezoelectric layer is used to build the cantilever assembly, as shown in FIG. 3A. It is understood that the term "unimorph" as is used in the present invention specifically refers to the cantilever actuator having one single piezoelectric layer, as shown in FIG. 3A. It is also understood that under certain circumstances, such an actuator made of a single layer of piezoelectric material, as shown in FIG. 3A, can also be referred to as a monomorph actuator.

Figure 3B:
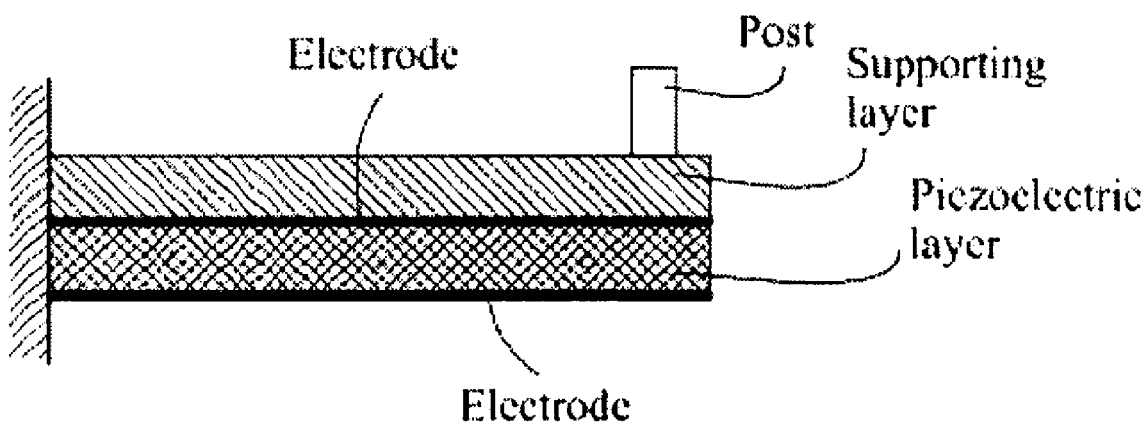
FIG. 3B is a cross sectional views of the layered structure for an electrode-coated cantilever bimorph used as the cantilever assembly in FIG. 3.
Figure 3C:
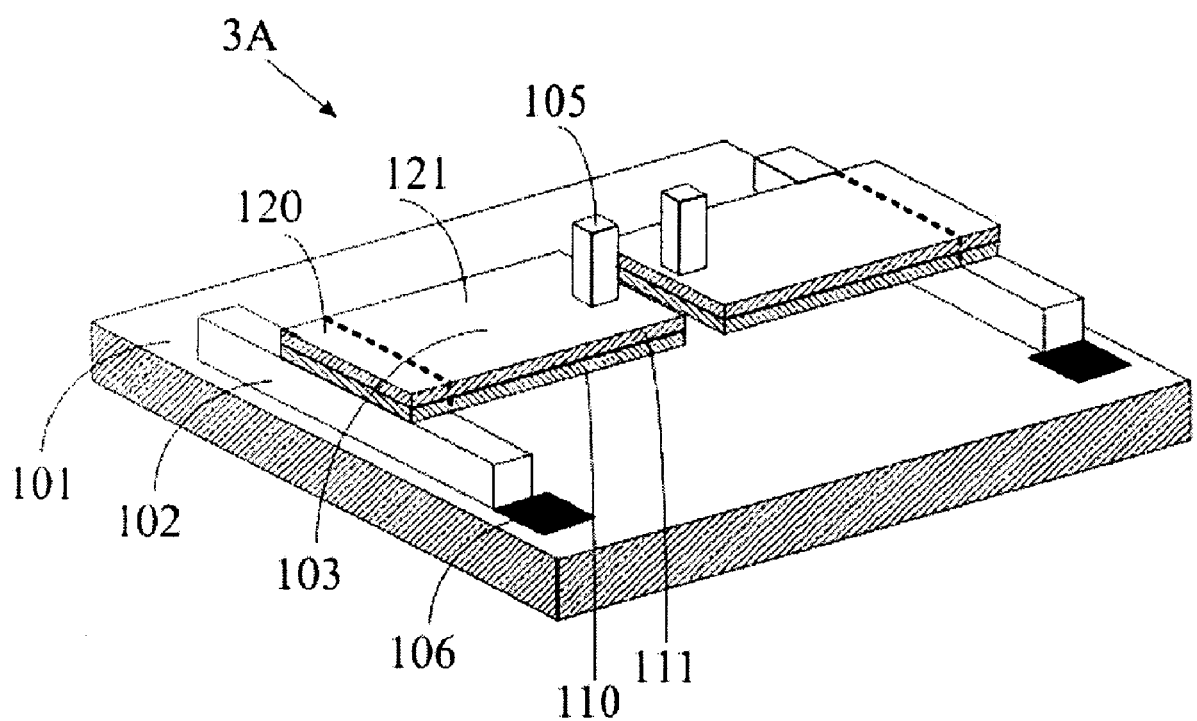
FIG. 3C is an enlarged view of a pair of the cantilever actuators being assigned to actuate one pixel of the deformable mirror device.

In accordance with the present invention, in some other preferred embodiments, the cantilever actuator is a bimorph cantilever actuator in which one (1) electrode-coated piezoelectric layer is used in combination of one (1) supporting layer to form the cantilever assembly, as shown in FIG. 3B.

In some other embodiments, the cantilever actuator is a multimorph cantilever microactuator in which one (1) layer of electrode-coated piezoelectric film is used in combination of at least two (2) separate material layers to form the cantilever actuator assembly.

Referring now to FIG. 3C, an enlarged conceptual isometric view of a pair of the piezoelectric cantilever actuators coupled to one pixel of the deformable mirror device, each of the cantilever assemblies comprises a supporting portion 120 disposed atop of the respective spacer 102, a floating cantilever portion 121 extending a respective length over the substrate, and equipped at the cantilever distal end a post member 105. The dashed line overlaid on the cantilever assembly 103 depicts the bounds of the portions 120 and 121. In this preferred embodiment, the pixel actuator cell 3A includes two cantilever actuator assemblies 103, and each of which may be independently controlled by applying varied voltage to the electrode 106. By having two cantilever actuator assemblies 103 per pixel, a deformable mirror device can couple displacement from both actuators per pixel.

Depending on application requirements, each pixel of the deformable mirror device can be designed to be actuated by using either one (1) cantilever actuator, or two (2) cantilever actuators, or more than two (2) cantilever actuators.

Depending on the application needs, the spacer 102 can be either electrically conductive or non-conductive.

In this preferred embodiment as shown in FIG. 3C, each actuator 103 comprises of a piezoelectric film 110 disposed on a micromachined support 102, and in establishing a piezoelectric bimorph cantilever, a second material layer 111 is used in mating with this first piezoelectric film 110.

The piezoelectric film 110 can be made of any piezoelectric material. In a preferred embodiment, the piezoelectric film 110 is a relaxor ferroelectric single crystal material such as lead manganese niobate lead titanate (PMN-PT) single crystal. Relaxor ferroelectric single crystal piezoelectric lead manganese niobate lead titanate (PMN-PT) and lead zinc niobate-lead titanate (PZN-PT) are a new generation of piezoelectric materials possessing prominent properties and are poised to advance piezoelectric applications. The attractiveness of these materials lies in the fact that their piezoelectric coefficients ($d_{33}$>1500 pC/N, $d_{31}$: 900~1900), electromechanical coupling factor ($K_{33}$~>0%) and strain levels (0.5%~1.2%) are significantly higher than those of conventional lead zirconate titanate (PZT) materials. Unlike piezoceramic and sol-gel film piezoactuators that employ strain magnification schemes, single crystal actuators can deliver higher strain levels without sacrificing generative force. Further, the low strain hysteresis and the stability of single crystals result in improved controllability for piezoactuators.

The second material layer 111 can be any mechanical material. In a preferred embodiment, the second material layer 111 can be the same material as the piezoelectric film. In another preferred embodiment, the second material layer 111 can be single crystal silicon material.

Figure 4A:
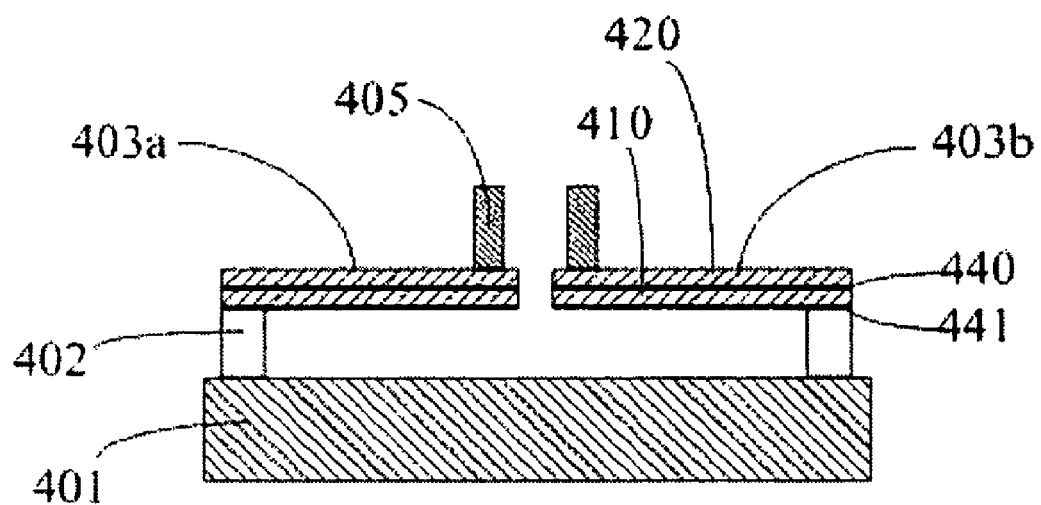
FIG. 4A is a schematic view of an actuator cell consisting of relaxor ferroelectric single crystal bimorphs and the post element.
Figure 4B:
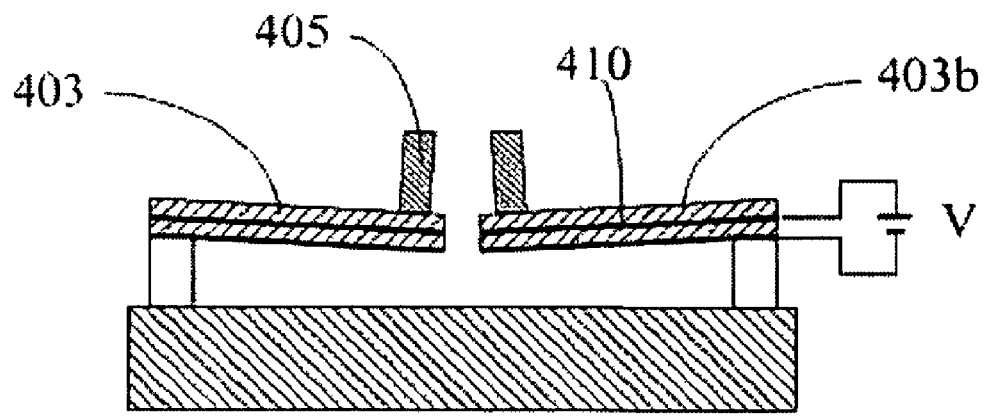
FIG. 4B is a schematic view of the actuator cell in FIG. 4A at the activated state showing that the constrictive displacement generated by the relaxor ferroelectric crystal layer is converted to a normal (vertical) deflection.

FIG. 4A shows the cross sectional view of an individual actuator cell comprising two (2) bimorph actuators 403a and 403b that are made of relaxor ferroelectric single crystal material. The spacer structure 402 is disposed on the substrate 401 to provide support for the actuator cell. In this preferred embodiment, the entire actuator cell (comprising a pair of bimorph actuators 403a and 403b) is responsible for actuating one pixel portion for a deformable mirror device. Each of the bimorph cantilever actuators comprises of a relaxor ferroelectric single crystal layer 410 and a mechanical supporting layer 420. The bimorph layer 410 is coated with two electrodes 440 and 441 to enable electrical connection to a power source. Each of the bimorph members of the actuator cell has a post element 405 located near the movable distal end. Depending on the dimensional sizes and elasticity of the post element, the post can be either rigid or resilient during an actuation process. Depending on applications, the post can be either electrical conductive or non-conductive. The supporting layer 420 can be made of any material by either bonding or depositing a thin film onto the active layer 420. In this preferred embodiment, as shown in FIG. 4B, only the layer 410 is biased in operation while the other layer 420 remains passive. However, in order to enhance the actuation force, the layer 420 can also be chosen as a piezoelectric material in some other preferred embodiments, acting as a second active layer in actuating the deformable mirror device. In such a manner, different voltages can be applied to the layers 410 and 420 to cause one layer to extend and the other to contract, respectively, and as a result, the travel range of the cantilever deflection is extended.

FIG. 4B shows an actuator cell at the activated state, and only one active layer is in use. With an applied voltage V, a small constrictive displacement is generated in the active relaxor ferroelectric layer, which is converted to a normal (vertical) displacement on the sampling post. Utilization of array of the relaxor ferroelectric actuator allows a compact, low cost, low voltage, and fast response actuation system for precise driving large aperture deformable mirrors.

As can be seen from FIG. 4A and FIG. 4B, the actuator concept is based on the piezoelectric bimorph effect instead of thermal bimorph effect. Furthermore, to enhance the thermal stability of the actuator, the supporting layer 420 of the bimorph actuator 403 can be selected as the same material as that of the active layer 410. Because the support layer provides an identical thermal expansion coefficient, the thermal bimorph effect is effectively quenched in the actuator design.

It is also understood that the bimorph effect of the cantilever bimorph structure (single-side fixed) is far more profound (for example, 5~20 times better) than that of a double-clamped bimorph beam. The later does not offer significant vertical deflection because of its symmetrically clamped boundary conditions and thus the restrained motion along the lateral plane.

Figure 5:
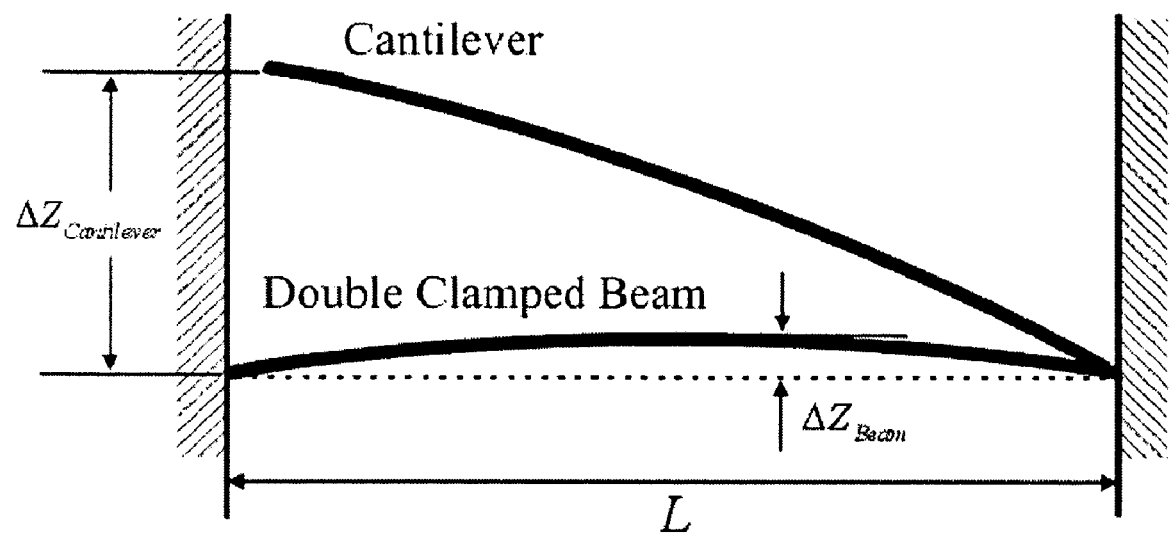
FIG. 5 is an illustrative view of the deformed shapes for two groups of actuators having different boundary conditions, showing that the bimorph cantilever actuator is able to generate larger deflection than the double-clamped beam actuator.

Comparing the performance of the cantilever bimorph to that of a double-clamped bimorph, FIG. 5 provides an illustrative view of the deformed shapes typically for both cantilever bimorph and double-clamped beam bimorph. Given the same cell length L and at the same actuation voltage, it is shown that the cantilever actuator is able to generate a deflection $\Delta Z_{Cantilever}$ significantly larger than that of the double-clamped beam actuator $\Delta Z_{Beam}$. Depending on the actuator dimensions and elastic properties, $\Delta Z_{Cantilever}$ can be up to 20 times that of $\Delta Z_{Beam}$. For example, given an actuator length of 500-μm at 200V actuation voltage, it can be analytically calculated that a bimorph actuator comprising of a 50-μm thick PMN crystal layer and a 5-μm silicon layer is capable of providing ~7.16-μm tip deflection, significantly larger than the 0.45-μm deflection that is calculated for the double-clamped beam actuator.

Figure 6:
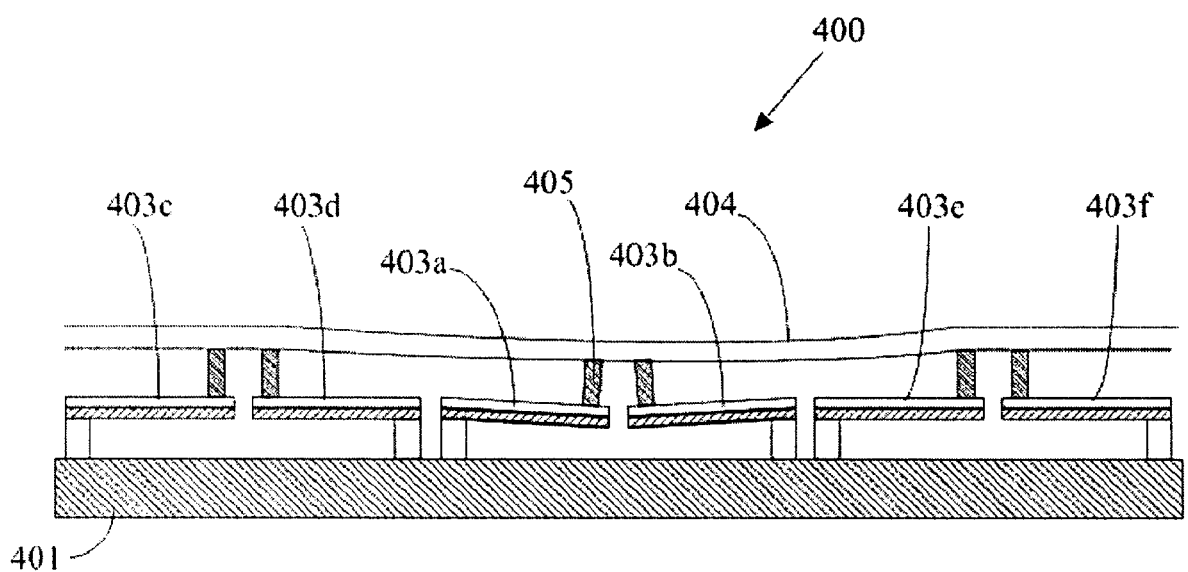
FIG. 6 is a cross sectional view of an illustrative deformable mirror device actuated by an array of cantilever assemblies comprising of relaxor ferroelectric bimorph cantilever actuators.

Now referring to FIG. 6, a cross sectional view of an illustrative deformable mirror device 400 built on a substrate 401. The device is actuated by array of cantilever assemblies comprising of a relaxor ferroelectric single crystal (e.g. PMN-PT) based bimorphs 403a-403f. The device utilizes an array of center-positioned linking posts 405 in the middle of each flexural cantilever elements as a joint link between array of microactuators 403a-403f and the deformable mirror faceplate 404. In the deformable mirror device 400, cantilever assemblies 403a and 403b are in the activated state, being deformed by the same actuation voltage, and allowing the attached membrane portion to deform. Cantilever assemblies 403c, 403d, 403e, and 403f, are in the open state. The displacement at the sample posts causes a spread distribution of deformation on the local pixel and its neighborhoods governed by the motion transfer and influence function, as shown in FIG. 6. By selectively setting the states of the cantilever assemblies 403a-403f, the deformable mirror device 400 can be utilized to form a deformable shape for the mirror faceplate 404. In so doing, the invention may optionally include electronic circuits embedded in the substrate 401 for the purpose of addressing the individual actuators and/or sensing the state of a given mirror segment.

In contrast to other electrostatic actuation based MEMS actuation approaches for deformable mirrors, such actuator-pixel pair design in accordance with the present invention is established as a "position" actuator". This feature is enabled by the large force and high stiffness of the relaxor ferroelectric single crystal (e.g. PMN-PT) cantilever actuators. Compared to single crystal Si electrostatic actuator DM technology, this single crystal piezoelectric actuator design is superior in its capability of being robust, high energy density, high stiffness, high bandwidth, lower driving voltage, lower influence function, immunity to undesirable lateral motion modes, and without Si spring tilting and lateral stiction problems. Compared to conventional PZT piezoelectric actuator DM technologies, the attractiveness of our MEMS DM approach lies in the fact that it offers 4~10 times piezoelectric properties improvement without employing strain magnification schemes. The approach is also superior in its lower hysteresis and high eletro-mechanic stabilities due to the nature of the single crystals. Furthermore, compared to the flextensional actuator that also utilizes the relaxor ferroelectric single crystal piezoelectric material, the bimorph cantilever design represents a much simple structure with straightforward manufacturing and being involved with less process steps.

Instead of the bimorph cantilever actuator as used in FIG. 6, the cantilever actuator for actuating a deformable mirror device can be configured as unimorph cantilever as well in accordance with the present invention. Only one electrode-coated piezoelectric layer is utilized in the cantilever actuator assembly, and in this case, there is no second supporting layer in direct mating (or in direct contact) with the piezoelectric layer.

Figure 7A:
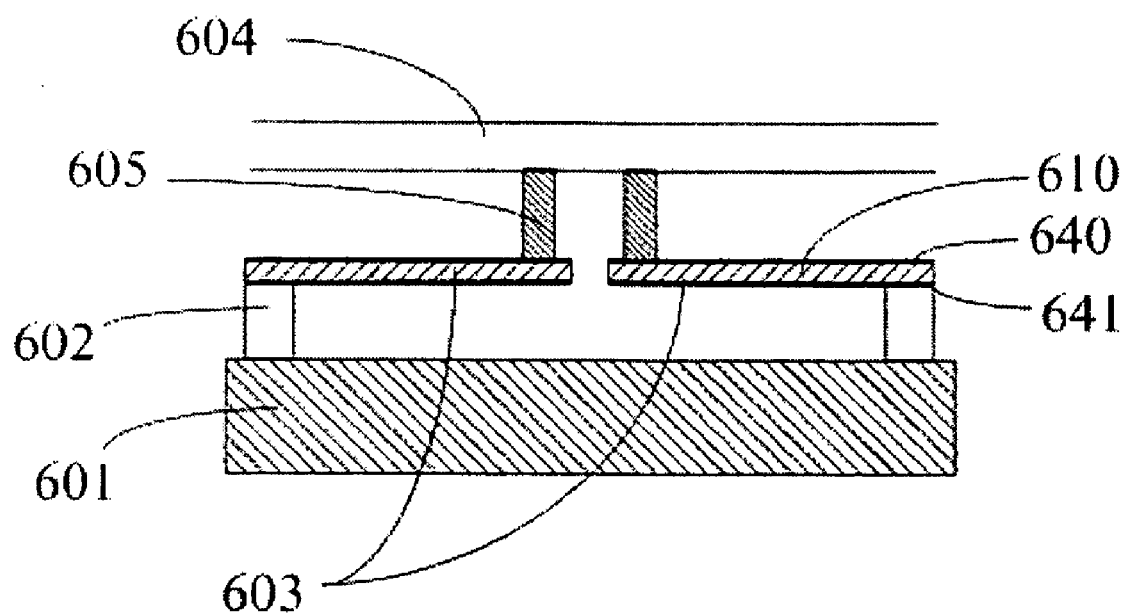
FIG. 7A is a schematic view of an actuator cell consisting of a relaxor ferroelectric single crystal unimorph, a post element, and a mirror portion in attachment.

Referring now to FIG. 7A, a cross sectional view of an individual actuator cell configured for using unimorph actuators, two (2) unimorph actuators 603 are used to deform a mirror portion 604. The actuator is unimorph in the sense that each actuator member 603 is made of only one relaxor ferroelectric single crystal thin film having coated electrodes 640 and 641 on its opposite surfaces. The electrodes build electrical connection to a power source, and the spacer structure 602 is disposed on the substrate 601 to provide mechanical support for the entire actuator cell. Each of the unimorph members in the actuator cell has at least one post element 605 located near the movable end. Depending on the dimensional sizes and elasticity of the post element, the post can be either rigid or resilient during an actuation process.

By use of the post structures 605 at the distal end of the unimorph cantilever, the mechanical connection is built in between the actuators 603 and the deformable mirror portion 604. In fact, in this preferred embodiment, the portion of the mirror membrane 604 coupled by the post is able to effectively act as the mechanical constrain for the unimorph actuator. Due to the constrain of the post and the associating mirror membrane portion, an in-plane constrictive displacement electrically induced by an actuation voltage in the unimorph layer is thus converted to a normal (vertical) displacement on both the post 605 and its associated mirror portion 604.

Figure 7B:
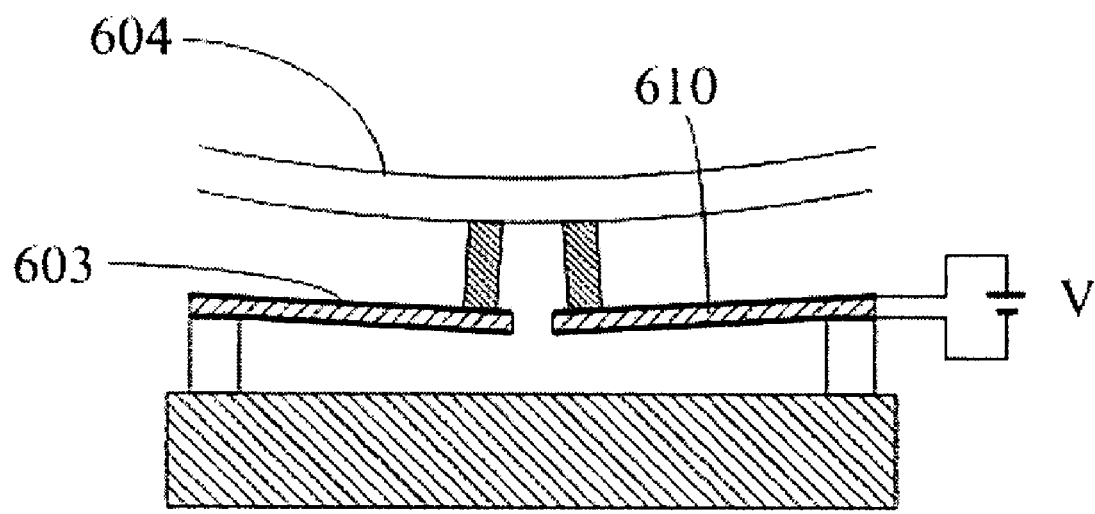
FIG. 7B is a schematic view of the actuator cell in FIG. 7A at the activated state showing that the constrictive displacement generated in the relaxor ferroelectric crystal layer is converted to a normal (vertical) deflection.

FIG. 7B shows the actuator cell at the activated state. With an applied voltage V, a small constrictive displacement is generated in the relaxor ferroelectric layer, leading to a normal (vertical) displacement on the sampling post and its attached mirror portion.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

What is claimed is:

1. A deformable mirror device comprising:
   a substrate;
   a plurality of spacer structure extending from the substrate;
   a plurality of cantilever actuator assembly disposed on the spacer structure, and each cantilever actuator assembly comprising at least one cantilever actuator having a supporting portion that is mechanically attached to the spacer structure, a floating cantilever portion that lies directly vertically over and spaced apart from the substrate, said the floating cantilever portion having a floating outer edge that is not clamped to the spacer structure, said the floating outer edge having a pre-determined two-dimensional geometry and said the geometry defining the material boundary of the floating cantilever portion, said the floating cantilever portion having a far end that receives maximum vertical displacement during actuation; and at least one post upstanding on and substantially near the far end of the floating cantilever portion, the post having two opposite faces, the first face in attachment with the floating cantilever portion, and the second surface substantially in parallel with the first face; and
   a deformable mirror membrane disposed on the plurality of cantilever actuator assembly by bonding to the second surface of each said post.

2. The cantilever actuator assembly of claim 1 in which the post is substantially rigid.

3. The cantilever actuator assembly of claim 1 in which the post is resilient capable of being deformed.

4. The cantilever actuator assembly of claim 1 in which each cantilever actuator comprises at least one piezoelectric multimorph cantilever actuator.

5. The cantilever actuator assembly of claim 1 in which each cantilever actuator comprises at least one piezoelectric bimorph cantilever actuator.

6. The cantilever actuator assembly of claim 1 in which each cantilever actuator comprises at least one piezoelectric unimorph cantilever actuator.

7. The piezoelectric multimorph cantilever actuator of claim 4 includes at least one electrode.

8. The piezoelectric bimorph cantilever actuator of claim 5 includes at least one electrode.

9. The piezoelectric unimorph cantilever actuator of claim 6 includes at least one electrode.

10. The deformable mirror device of claim 1 in which the spacer structures are not electrically conductive.

11. The deformable mirror device of claim 1 in which the spacer structures are electrically conductive.

12. The deformable mirror device of claim 1 in which the substrate includes at least one electrode in connection with the electrodes of each of the said plurality of cantilever actuator assemblies.

13. The deformable mirror device of claim 1 in which the substrate includes semiconductor integrated driver circuits and associating electrodes in interconnections with the electrodes in the said plurality of cantilever actuator assemblies.

14. A deformable mirror device comprising:
   a substrate;
   an array of spacer structures extending from the substrate;
   an array of relaxor ferroelectric single crystal bimorph cantilevers disposed on the spacer structures, each relaxor ferroelectric single crystal bimorph cantilever comprising at least one bimorph cantilever actuator having a supporting portion that is mechanically attached to the spacer structure, a floating cantilever portion that lies directly vertically over and spaced apart from the substrate, said the floating cantilever portion having a floating outer edge that is not clamped to the spacer structure, said the floating outer edge having a pre-determined two-dimensional geometry and said the geometry defining the material boundary of the floating cantilever portion, said the floating cantilever portion having a far end that receives maximum vertical displacement during actuation;
   an array of posts disposed on the floating portion of the relaxor ferroelectric single crystal bimorph cantilevers, at least one post upstanding on and substantially near the far end of the said floating portion of each cantilever, the post having two opposite faces, the first face in attachment with the floating cantilever portion, and the second surface substantially in parallel with the first face; and
   a deformable mirror membrane disposed on the array of posts by bonding to the second surface of each said post.

15. A deformable mirror device comprising:
   a substrate;
   an array of spacer structures extending from the substrate;
   an array of relaxor ferroelectric single crystal unimorph cantilevers disposed on the spacer structures, and each relaxor ferroelectric single crystal unimorph cantilever comprising at least one unimorph cantilever actuator having a supporting portion that is mechanically attached to the spacer structure, a floating cantilever portion that lies directly vertically over and spaced apart from the substrate, said the floating cantilever portion having a floating outer edge that is not clamped to the spacer structure, said the floating outer edge having a pre-determined two-dimensional geometry and said the geometry defining the material boundary of the floating cantilever portion, said the floating cantilever portion having a far end that receives maximum vertical displacement during actuation;
   an array of posts disposed on the floating portions of the relaxor ferroelectric single crystal unimorph cantilevers, at least one post upstanding on and substantially near the far end of the said floating portion of each cantilever, the post having two opposite faces, the first face in attachment with the floating cantilever portion, and the second surface substantially in parallel with the first face; and
   a deformable mirror membrane disposed on the array of posts by bonding to the second surface of each said post.

* * * * *